Jan. 7, 1936.  M. L. ARONSON  2,026,768
ATTACHMENT FOR RULERS
Filed Jan. 19, 1934
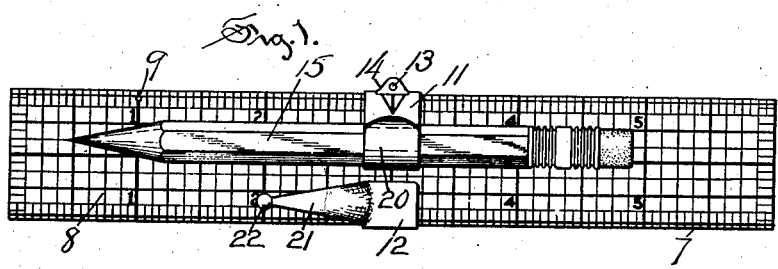
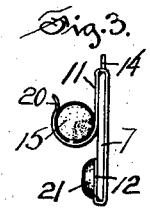
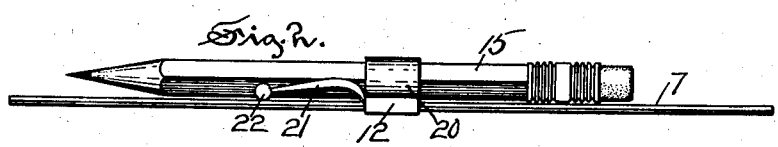
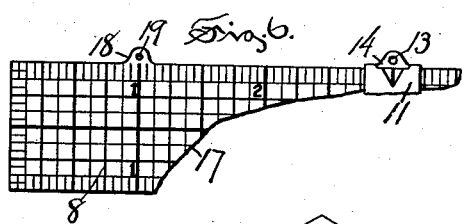
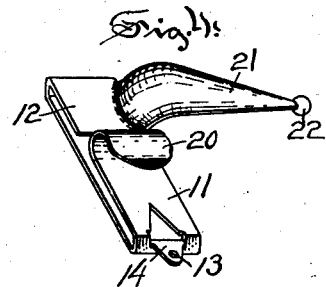
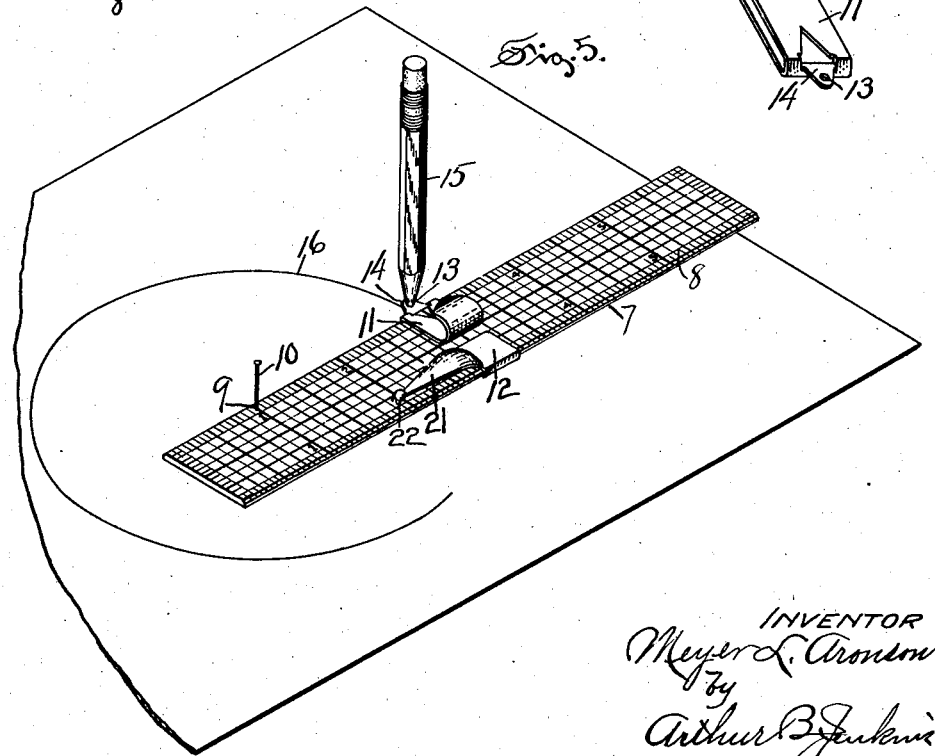
INVENTOR
Meyer L. Aronson.
By
Arthur B. Jenkins,
ATTORNEY Patented Jan. 7, 1936

2,026,768

UNITED STATES PATENT OFFICE 2,026,768

ATTACHMENT FOR RULERS

Meyer L. Aronson, Hartford, Conn., assignor of one-half to William Zachs, Hartford, Conn.

Application January 19, 1934, Serial No. 707,342

5 Claims. (Cl. 33—27)

My invention relates to devices arranged for attachment to rulers whereby circles may be drawn by the use of such ruler and attachment, and the graduations on the ruler may be made use of to determine the radius or diameter of the circle.

One form of an attachment embodying my invention, and in the construction and use of which the objects herein set out, as well as others, may be attained is illustrated in the accompanying drawing, in which—

Figure 1 is a face view of a ruler with my improved attachment placed thereon.

Figure 2 is an edge view of the same.

Figure 3 is an end view.

Figure 4 is an isometric view of the attachment.

Figure 5 is an isometric view illustrating a manner of use of the attachment.

Figure 6 is a view of a fragment of a ruler illustrating a modification of the device.

In the accompanying drawing the numeral 7 denotes a ruler that may be of any approved form having parallel opposite edges and provided with such markings or graduations 8 as may be desired. A pivot hole 9 extending through the ruler near one edge is provided for the reception of a pin 10 or other suitable pointed instrument to serve as an axis on which the ruler may be rotated.

My improved attachment comprises a band which is wrapped about the ruler and is made to slidably fit thereon for movement endwise thereof. This band has lips 11—12 overlapping the ruler on one face and preferably closely approaching each other. The lip 11 has a pencil point receiver 13 in the form of a hole extending through an ear 14 projecting from the back of the lip 11.

In a manner of use the attachment is slid lengthwise along the ruler until the hole 13 is opposite a graduation which will indicate a distance from the hole 9 which it is desired the radius of a circle to be obtained shall have. A pin 10 is then inserted in the hole 9 and the point of a pencil 15 is inserted in the hole 13, and by rotating the ruler on the axis of the pin 9 a circle 16 is obtained.

It is appreciated that in the form of the structure shown in Figs. 1–4 the graduations will not accurately denote the radius of the circle to be produced, but it will be close enough to serve all practical purposes for which the instrument is designed.

If, however, finer results are desired, then the ruler 17 may be provided with an ear 18, as shown in Fig. 6, said ear having a hole 19 formed therein which will be substantially a distance from the line of the edge of the ruler as that at which the hole 13 in the ear 14 is located. With this form of the device the radius of the circle to be drawn may be more closely fixed by use of the graduations 8 on the ruler.

In order that a pencil may be conveniently had for use with the ruler, the lip 11 is curved backwardly upon itself, thereby forming a spring clip 20 of a size suitable to receive the pencil 15, and as shown in Fig. 1 of the drawing.

The ruler is preferably made of such size that it may be carried in the pocket of a garment, and when thus carried the pencil will be conveniently accessible for any use that may be desired.

In order to retain the pencil and the ruler from accidental removal from the pocket, the lip 12 has a holding finger 21 extended therefrom with a knob 22 at its outer end. This finger is positioned close enough to the ruler, when the attachment is affixed thereto, to exert a frictional grasp upon the outer wall of the pocket so that a little force will be required to remove the attachment and the ruler with the pencil thereon from the pocket.

I claim—

1. A ruler attachment comprising a band having a main portion engaging one side of the ruler and fitted for sliding movement lengthwise along the ruler by means of ends backturned from said main portion to receive the opposite edges and the opposite side of said ruler, said attachment having an ear at the bend of one of said backturned ends with a hole for the reception of the point of a pencil wherewith to transcribe a circle in connection with another hole in the ruler to establish the center of said circle.

2. A ruler attachment comprising a band fitted for sliding movement lengthwise along the ruler, said attachment having a hole positioned for location outside of and adjacent the edge of the ruler for the reception of the point of a pencil therein wherewith to transcribe a circle in connection with another hole in the ruler.

3. A ruler having a hole formed therein near one edge and an attachment comprising a band having a main portion engaging one side of the ruler and fitted for sliding movement lengthwise along the ruler by means of ends backturned from said main portion to receive the opposite edges and the opposite side of said ruler, said band having a hole for the reception of the point of a pencil.

4. A ruler having a hole formed therein near one edge and an attachment comprising a main portion engaging one side of the ruler and fitted for sliding movement lengthwise along the ruler by means of ends backturned from said main portion to receive the opposite edges and the opposite side of said ruler, said attachment also having a hole for the reception of the point of a pencil therein.

5. A ruler having an ear with a hole therein substantially in line with the edge of the ruler and an attachment comprising a band having a main portion engaging one side of the ruler and fitted for sliding movement lengthwise along the ruler by means of ends backturned from said main portion to receive the opposite edges and the opposite side of the ruler and also having a hole for the reception of the point of a pencil substantially in the same distance from the edge of the ruler as that at which the hole in the ruler is located.

MEYER L. ARONSON.